April 30, 1968 P. L. ALBRIGHT 3,380,779
EMERGENCY WHEEL HAVING INDIVIDUAL RESILIENT SPOKE
AND TREAD PORTIONS
Filed Oct. 24, 1965

INVENTOR.
P. L. ALBRIGHT

United States Patent Office 3,380,779
Patented Apr. 30, 1968

3,380,779
EMERGENCY WHEEL HAVING INDIVIDUAL
RESILIENT SPOKE AND TREAD PORTIONS
Penrose Lucas Albright, 1523 Woodacre Drive,
McLean, Va. 22101
Filed Oct. 24, 1965, Ser. No. 504,949
4 Claims. (Cl. 301—38)

ABSTRACT OF THE DISCLOSURE

A wheel wherein the periphery is made of overlapping diagonal resilient members so that viewed from the side, such members form a continuous circle about the wheel's axle; the spokes connecting such members with the axle also being resilient and extending at a bias from the axle so that the connections to the axle and to the peripheral members fall within the surface of an imaginary cone having the same axis as the axis of rotation of the wheel.

Summary and objects of the invention

This invention relates to a wheel. More particularly, it relates to an improved wheel with a periphery adapted to expand or contract in response to the lateral forces acting along the wheel's axle.

The object of the invention is to provide a wheel with the periphery having continuous contact with the ground, although the periphery itself is not necessarily a continuous member but may be constituted of a plurality of members. It is a further object of the invention to connect such periphery to an axle by resilient connecting means whereby a lateral force on said axle means along its axis in one direction causes said periphery to expand and in the other direction causes it to contract.

Other objects, adaptabilities and capabilities will be appreciated as the description progresses, reference being had to the accompanying drawings in which:

Description of the preferred embodiments

Figure 1:
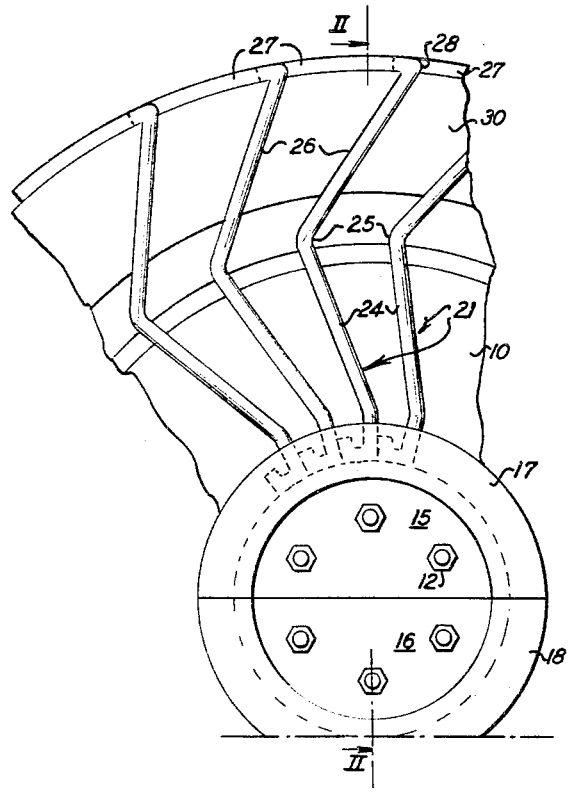
FIG. 1 is a fragmentary side view of one embodiment of the invention.
Figure 2:
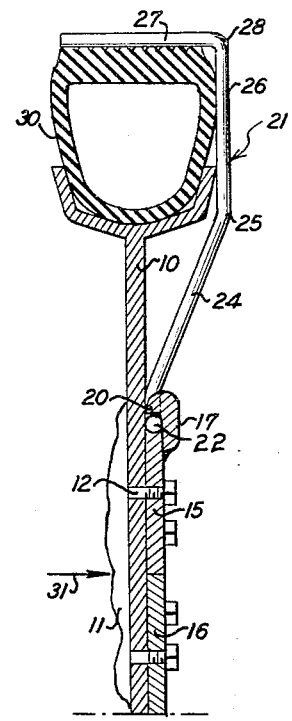
FIG. 2 is a sectional view, partly in elevation, taken on lines II—II of FIG. 1.
Figure 3:
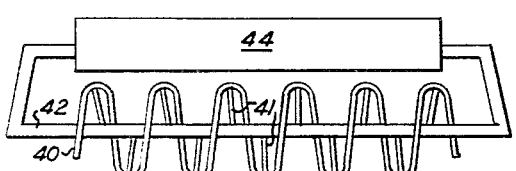
FIG. 3 is a schematic plan view of the embodiment shown in FIG. 1.

In the embodiment shown in FIGS. 1–3, a conventional automobile wheel 10 is secured to an axle portion 11 by means of studs 12 extending from the portion 11 through holes in the wheel 10, and nuts 14 engaging such studs. The nuts 14 also secure a central hub comprising a pair of half-plates 15 and 16 against and firmly to the wheel 10. The half-plates 15 and 16 have flange members 17 and 18, respectively, secured thereto by welding or other suitable means. The flange members 17 and 18 include hook members 20 which secure to the flange members a plurality of connecting members, each designated generally 21.

Each connecting member 21 includes a hinge part 22 which cooperates with its associated hook member 20 so, as seen in FIG. 2, the connecting member is restricted from clockwise movement. However, if half plate 15 should be disconnected from wheel 10, connecting member 21 may pivot counter-clockwise about hinge part 22.

From hinge part 22 extends a first spoke portion 24, a bent part 25, and a second spoke portion 26. Extending normally from portion 26 and diagonally with reference to the axis of rotation of the wheel 10 is a ground engaging periphery portion 27.

A tire 30 is also included on the wheel 10. Connecting members 21 are preferably composed of resilient steel wire sufficiently strong so that approximately three such members provide sufficient support for the weight to be carried by the wheel involved. The connection 28 between portions 26 and 27 is relatively rigid as is portion 27 whereby the weight on the wheel tends to be distributed uniformly along each peripheral portion 27 bearing same.

The embodiment shown in FIGS. 1–3 may serve as an emergency wheel or as mud or snow traction means over the conventional tire 30.

Figure 4:
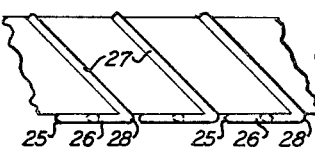
FIG. 4 is a representation in elevation of a further embodiment of the invention.
Figure 5:
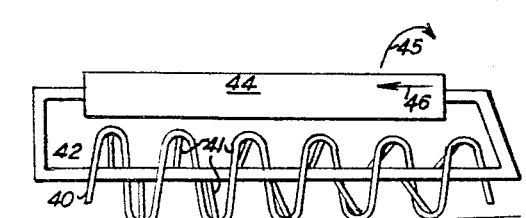
FIG. 5 is similar to FIG. 4 illustrating the application of lateral force on the wheel.

Because of the outward inclination of the spoke portions 24 and 26 the circumference of peripheral members 27 increases in the vicinity of the ground when relative force is exerted on the wheel in the direction of arrow 31 and decreases if force is exerted in the opposite direction. This phenomenon is illustrated more clearly in FIGS. 4 and 5 where the wheel 40 is in a helical form, the spokes 41 are inclined increasingly outward from the center towards the sides as illustrated; the spokes 41 connecting the wheel 40 and the axle 42. The axle 42 supports a vehicle designated as box 44. When vehicle 44 turns as indicated by arrow 45 in FIG. 5, centrifugal force acts in the direction indicated by arrow 46 causing the spokes 41 on the left to straighten whereas those on the right become more inclined with the result that wheel 40 has its periphery increased on the left and decreased on the right so that vehicle 44 leans into the curve. The turning of the vehicle is otherwise facilitated by the resulting distortion of wheel 40.

Figure 6:
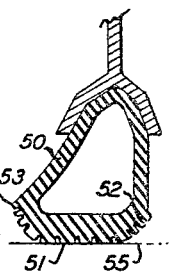
FIG. 6 is a sectional view of a tire embodiment.
Figures 7, 8:
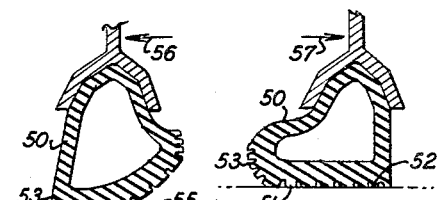
FIGS. 7 and 8 are sectional views illustrating the application of lateral force on the tire shown in FIG. 6.

In FIGS. 6–8, the cross-section of the tire 50 is shown. The tread portion 51 is conventional. However, the tread portions 52 and 53 are designed for heavy traction. When there is no lateral force on the tire 50, it will normally have tread 51 in contact with surface 55 as shown in FIG. 6. However, if relative force is exerted in the direction indicated by arrow 56, the effective circumference of the tire in contact with the surface 55 is increased and the heavy traction tread 53 is brought into contact with the surface. Conversely, if the relative force is in the direction indicated by arrow 57, the effective circumference of tire 50 at surface 55 is decreased and heavy tread 52 is brought into contact with surface 55. Assuming that tires 50 are inclined outwardly with respect to a vehicle they bear, the vehicle thereby tends to lean into curves and at the same time traction on the curves is improved. The same is true if the vehicle is disposed sideways on a steep incline.

While I have described preferred embodiments of my invention, it is to be understood that it is capable of other adaptations and modifications within the scope of the appended claims.

Having thus described my invention, what I claim as new and desire to cover by Letters Patent of the United States is:

1. A wheel which comprises central hub means, ground engaging means, and resilient spoke means interconnecting said hub means and said ground engaging means, said ground engaging means comprising a plurality of individually movable axially extending ground engaging portions extending diagonally in overlapping echelon with reference to a plane perpendicular to the axis of rotation of said axle means, whereby said ground engaging portions are individually movable to conform to ground irregularities and provide continuous surface for engagement with the ground when the wheel is rolled thereon.

2. A wheel in accordance with claim 1 wherein said ground engaging portions are substantially equidistant throughout their length from the axis of rotation of said hub means.

3. A wheel in accordance with claim 1 wherein the connections of said spoke means to said hub means and to said ground engaging means all lie substantially in the surface of a cone having its axis coincide with the axis of rotation of said hub means.

4. A wheel in accordance with claim 1 wherein said spoke means comprises spokes, each of said spokes having a first portion extending outwardly from said hub means, a second portion extending inwardly from said ground engaging means and a bent portion interconnecting said first and second portions.

References Cited

UNITED STATES PATENTS

| | | | |
|---|---|---|---|
| 1,438,339 | 12/1922 | Shannon | 301—39 |
| 3,071,173 | 1/1963 | Hoffmann | 152—216 |
| 3,093,180 | 6/1963 | Jones | 152—216 |
| 3,130,767 | 4/1964 | Davis | 152—216 |
| 3,132,682 | 5/1964 | Fox | 152—216 |

FOREIGN PATENTS 535,530  11/1955  Italy.

RICHARD J. JOHNSON, *Primary Examiner.*